United States Patent
Shim et al.

(10) Patent No.: US 10,608,265 B2
(45) Date of Patent: Mar. 31, 2020

(54) SYSTEM FOR CONTROLLING LOW-TEMPERATURE STARTING OF FUEL CELL VEHICLE AND METHOD FOR THE SAME

(71) Applicant: HYUNDAI MOTOR COMPANY, Seoul (KR)

(72) Inventors: Ji Hyun Shim, Seoul (KR); Chang Ho Kim, Yongin-si (KR); Sang Hyun Kim, Seongnam-si (KR)

(73) Assignee: Hyundai Motor Company, Seoul (KR)

(*) Notice: Subject to any disclaimer, the term of this patent is extended or adjusted under 35 U.S.C. 154(b) by 1150 days.

(21) Appl. No.: 14/864,421

(22) Filed: Sep. 24, 2015

(65) Prior Publication Data

US 2016/0141666 A1 May 19, 2016

(30) Foreign Application Priority Data

Nov. 19, 2014 (KR) .................. 10-2014-0161322

(51) Int. Cl.
| | | |
|---|---|---|
| *H01M 8/04223* | (2016.01) | |
| *H01M 8/04225* | (2016.01) | |
| *H01M 8/04302* | (2016.01) | |
| *H01M 8/0432* | (2016.01) | |
| *H01M 8/04746* | (2016.01) | |
| *H01M 8/04089* | (2016.01) | |

(52) U.S. Cl.
CPC ..... *H01M 8/04268* (2013.01); *H01M 8/0432* (2013.01); *H01M 8/04089* (2013.01); *H01M 8/04225* (2016.02); *H01M 8/04253* (2013.01); *H01M 8/04302* (2016.02); *H01M 8/04753* (2013.01); *H01M 2250/20* (2013.01); *Y02T 90/32* (2013.01)

(58) Field of Classification Search
CPC ......... H01M 8/04268; H01M 8/04302; H01M 8/04225; H01M 8/04089; H01M 8/04253; H01M 8/0432; H01M 8/04753; H01M 2250/20; Y02T 90/32
See application file for complete search history.

(56) References Cited

U.S. PATENT DOCUMENTS

| | | | |
|---|---|---|---|
| 6,329,089 B1 * | 12/2001 | Roberts ............. | H01M 8/04089 429/429 |
| 7,297,427 B2 | 11/2007 | Kurosaki et al. | |
| 2008/0102336 A1 * | 5/2008 | Strohl ............... | H01M 8/04104 429/444 |

FOREIGN PATENT DOCUMENTS

| | | | |
|---|---|---|---|
| JP | 2002093445 A | * | 3/2002 |
| JP | 2004-355945 A | | 12/2004 |

(Continued)

*Primary Examiner* — Amy Cohen Johnson
*Assistant Examiner* — Paul D Baillargeon
(74) *Attorney, Agent, or Firm* — Morgan, Lewis & Bockius LLP

(57) ABSTRACT

A system for controlling low-temperature starting of a fuel cell vehicle includes a high-pressure hydrogen flow control valve controlling a flow of hydrogen supplied to a fuel cell stack. A fuel cell controller is configured to change and control an opening rate of the high-pressure hydrogen flow control valve when an internal temperature of the fuel cell stack is a reference value or less. When the opening rate of the high-pressure hydrogen flow control valve decreases, a pressure of the hydrogen passing through the high-pressure hydrogen flow control valve decreases to increase a temperature of the hydrogen which is supplied to the fuel stack.

9 Claims, 3 Drawing Sheets

(56) References Cited

FOREIGN PATENT DOCUMENTS

| | | |
|---|---|---|
| JP | 2008-147139 A | 6/2008 |
| JP | 2008-226712 A | 9/2008 |
| KR | 10-2004-0003575 A | 1/2004 |
| KR | 2005-0024144 A | 3/2005 |
| KR | 10-0893431 B1 | 4/2009 |
| KR | 10-2009-0111925 A | 10/2009 |
| KR | 10-2014-0029791 A | 3/2014 |

\* cited by examiner

SYSTEM FOR CONTROLLING LOW-TEMPERATURE STARTING OF FUEL CELL VEHICLE AND METHOD FOR THE SAME

CROSS-REFERENCE TO RELATED APPLICATION

This application claims under 35 U.S.C. § 119(a) the benefit of priority to Korean Patent Application No. 10-2014-0161322 filed on Nov. 19, 2014, the entire content of which is incorporated herein by reference.

TECHNICAL FIELD

The present disclosure relates to a system and a method for controlling low-temperature starting of a fuel cell vehicle, and more particularly, to a system and a method for controlling low-temperature starting of a fuel cell vehicle, which increases temperatures of hydrogen and air and supplies the hydrogen and the air to a fuel cell stack to reduce a low-temperature starting time.

BACKGROUND

In general, a hydrogen fuel cell vehicle, which uses hydrogen as a fuel, uses electric charges generated by reacting hydrogen and oxygen and generates propulsion force by driving a drive motor in the vehicle. In evaluating performance of the hydrogen fuel cell vehicle, a cold starting temperature and a starting time are important factors.

In a general fuel cell, hydrogen and oxygen actively react to each other at a specific temperature, and operations for increasing a temperature of a fuel cell system in a vehicle are performed at a relatively low temperature (for example, approximately 2° C. below zero).

As an example, a method for increasing a temperature of a fuel cell system in a related art includes a method that increases an internal temperature of the fuel cell by mounting a heater in the system.

As another example, a method, which increases an internal temperature of a fuel cell stack using a heater in a related art, increases a temperature of air and supplies the temperature-increased air to the fuel cell stack by using a heater to help increasing a surface temperature of a stack cathode side, but since a temperature at a stack anode side needs to be implemented by heat transfer by conduction, it is insufficient to increase a stack temperature to a target level. Further, when the heater heats the hydrogen supplied to the anode side of the fuel cell stack, it is impossible to directly heat the hydrogen due to explosion.

The above information disclosed in this Background section is only for enhancement of understanding of the background of the invention, and therefore, it may include information that does not form the prior art that is already known in this country to a person of ordinary skill in the art.

SUMMARY OF THE DISCLOSURE

The present disclosure has been made in an effort to provide a system and a method for controlling low-temperature starting of a fuel cell vehicle which increases an internal temperature of a stack to a target level within a shortest time by increasing temperature of hydrogen and air supplied to a fuel cell stack and supplying hydrogen and oxygen to reduce an in-stack activation time.

According to an embodiment of the present inventive concept, a system for controlling low-temperature starting of a fuel cell vehicle includes a high-pressure hydrogen flow control valve controlling a flow of hydrogen supplied to a fuel cell stack. A fuel cell controller is configured to change and control an opening rate of the high-pressure hydrogen flow control valve when an internal temperature of the fuel cell stack is a reference value or less. When the opening rate of the high-pressure hydrogen flow control valve decreases, a pressure of the hydrogen passing through the high-pressure hydrogen flow control valve decreases to increase a temperature of the hydrogen supplied to the fuel cell stack.

The fuel cell controller may determine a pressure difference value required between a front end and a rear end of the high-pressure hydrogen flow control valve in accordance with a temperature difference between the front end and the rear end of the high-pressure hydrogen flow control valve, and determine the opening rate of the high-pressure hydrogen flow control valve in accordance with the pressure difference value.

The fuel cell controller may determine the opening rate of the high-pressure hydrogen flow control valve in proportion to an amount of hydrogen required by the fuel cell stack when the internal temperature of the stack is the reference value or less during high-output driving of the stack.

The fuel cell controller may actuate a heater for heating air supplied to the fuel cell stack when the internal temperature of the stack is the reference value or less.

According to another embodiment of the present inventive concept, a system for controlling low-temperature starting of the fuel cell vehicle includes a high-pressure hydrogen flow control valve controlling a flow of hydrogen supplied to a fuel cell stack. A fuel cell controller is configured to determine an opening rate of the high-pressure hydrogen flow control valve in proportion to an amount of hydrogen required by the fuel stack when an internal temperature of the stack is a reference value or less during high-output driving of the stack. A pressure of the hydrogen, which passes through the high-pressure hydrogen flow control valve, decreases in accordance with the opening rate of the high-pressure hydrogen flow control valve to increase a temperature of the hydrogen supplied to the fuel stack.

According to another embodiment of the present inventive concept, a method for controlling low-temperature starting of a fuel cell vehicle includes determining whether an internal temperature of a fuel cell stack measured using a temperature sensor is a reference value or less by a fuel cell controller. The fuel cell controller control and change an opening rate of a high-pressure hydrogen flow control valve when the internal temperature is the reference value or less.

According to the exemplary embodiment of the present inventive concept, the system for controlling low-temperature starting of a fuel cell vehicle increases the temperature of air supplied to a cathode side of a fuel cell stack by using a heater of an air supply system and increases the temperature of hydrogen supplied to an anode side of the fuel cell stack by using a high-pressure hydrogen flow control valve to which a Joule Thomson effect is applied to increase an internal temperature of the fuel stack within a short period of time, thereby reducing a low-temperature starting time by reducing a low-temperature starting stack activation time.

Hydrogen of which the temperature increases is supplied to the stack to delay internal cooling of the stack in low-temperature driving and the temperature of the hydrogen supplied to the stack at a peak output thereof increases to improve the output.

Other aspects and embodiments are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure.

Figure 1:
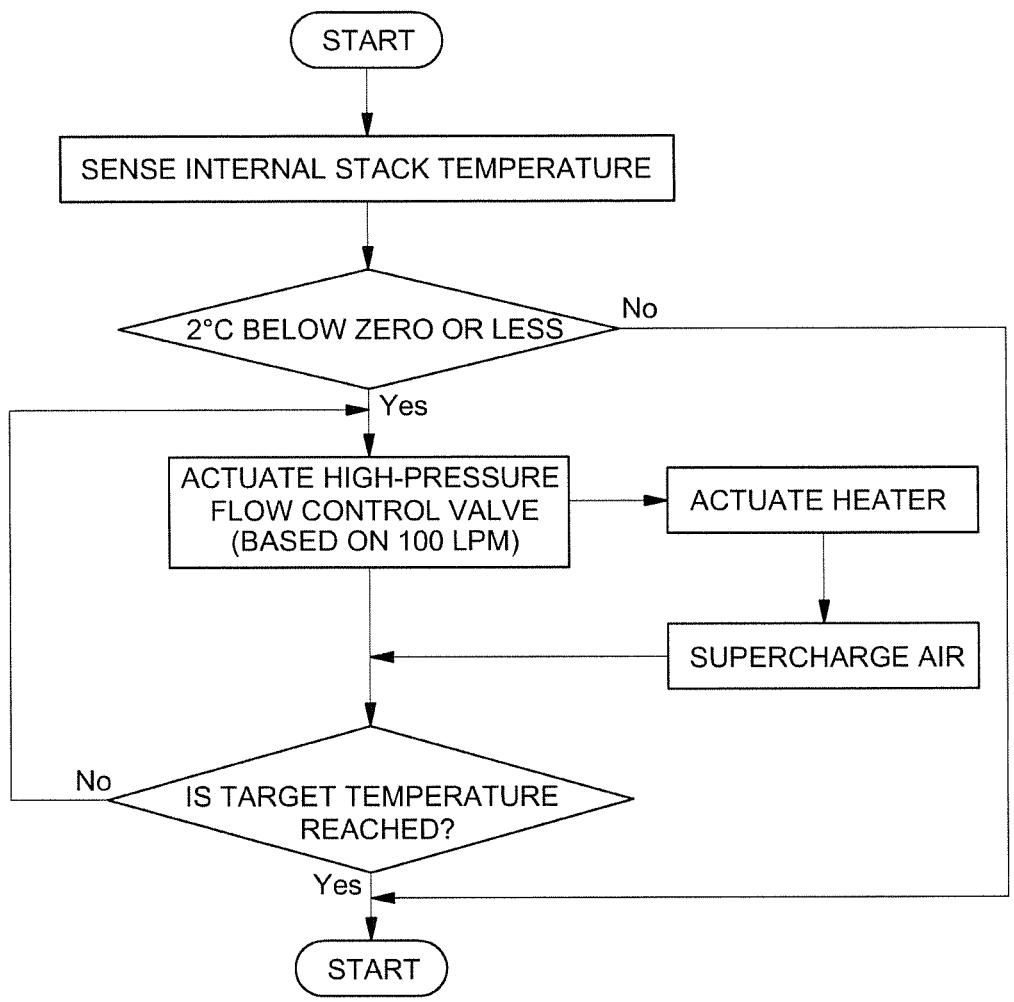
FIG. 1 is a flowchart illustrating a method for controlling a fuel cell system in low-temperature starting of a vehicle according to an exemplary embodiment of the present inventive concept.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Hereinafter, reference will now be made in detail to various embodiments of the present inventive concept, examples of which are illustrated in the accompanying drawings and described below.

As known, when gas compressed at a high pressure is discharged through an insulated narrow passage, enthalpies of the gas before and after discharging are equal to each other. During such a process, a change in temperature does not occur, but since molecules interact with each other in actual gas, the change in temperature occurs. Such a phenomenon is referred to as a Joule Thomson effect.

In the present disclosure, hydrogen of which temperature increases is supplied to a fuel cell stack in low-temperature starting of a fuel cell vehicle by using the Joule Thomson effect to shorten a stack activation time, thereby reducing a low-temperature starting time.

Upon or just after low-temperature starting of the fuel cell vehicle, the temperature of hydrogen increases by using a high-pressure hydrogen flow control valve for controlling the flow of high-pressure hydrogen supplied to the fuel cell stack from a hydrogen supply system of a fuel cell system to help activation of the fuel cell stack.

When the high-pressure hydrogen is depressurized through an orifice having a narrow passage, the temperature of hydrogen may increase differently from other gas.

Therefore, in the present disclosure, a stack operating temperature may be reached rapidly due to the temperature increase of air by using a heater of an air supply system and due to the temperature increase of hydrogen by using the high-pressure hydrogen flow control valve of the related art.

The air supplied to the stack helps increasing a surface temperature of a stack cathode side. However, since a surface temperature of a stack anode side increases by only heat transfer through conduction, there is insufficiency and the hydrogen is directly supplied by using the high-pressure hydrogen flow control valve to reach the surface of the anode side as described above, thereby reducing the stack activation time.

Figure 3:
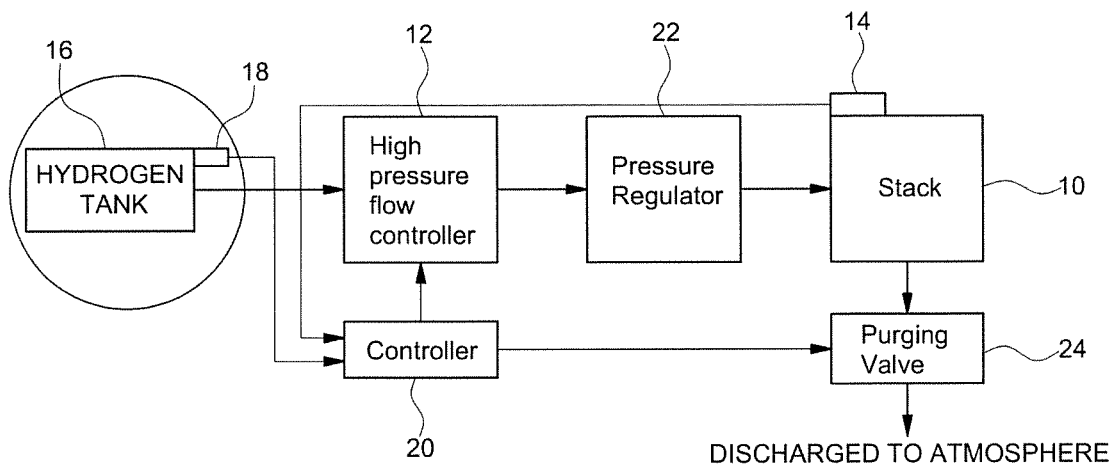
FIGS. 3 and 4 are configuration diagrams illustrating a system for controlling low-temperature starting of a fuel cell vehicle according to an exemplary embodiment of the present inventive concept.

Herein, the high-pressure hydrogen flow control valve is installed in the hydrogen supply system of the fuel cell system to increase temperature through hydrogen discharged and supplied to the stack from a hydrogen tank or to increase the temperature through hydrogen, and for example, may be mounted between the hydrogen tank discharging and supplying stored hydrogen and the fuel cell stack receiving hydrogen and giving an output (see FIG. 3).

Figure 2:
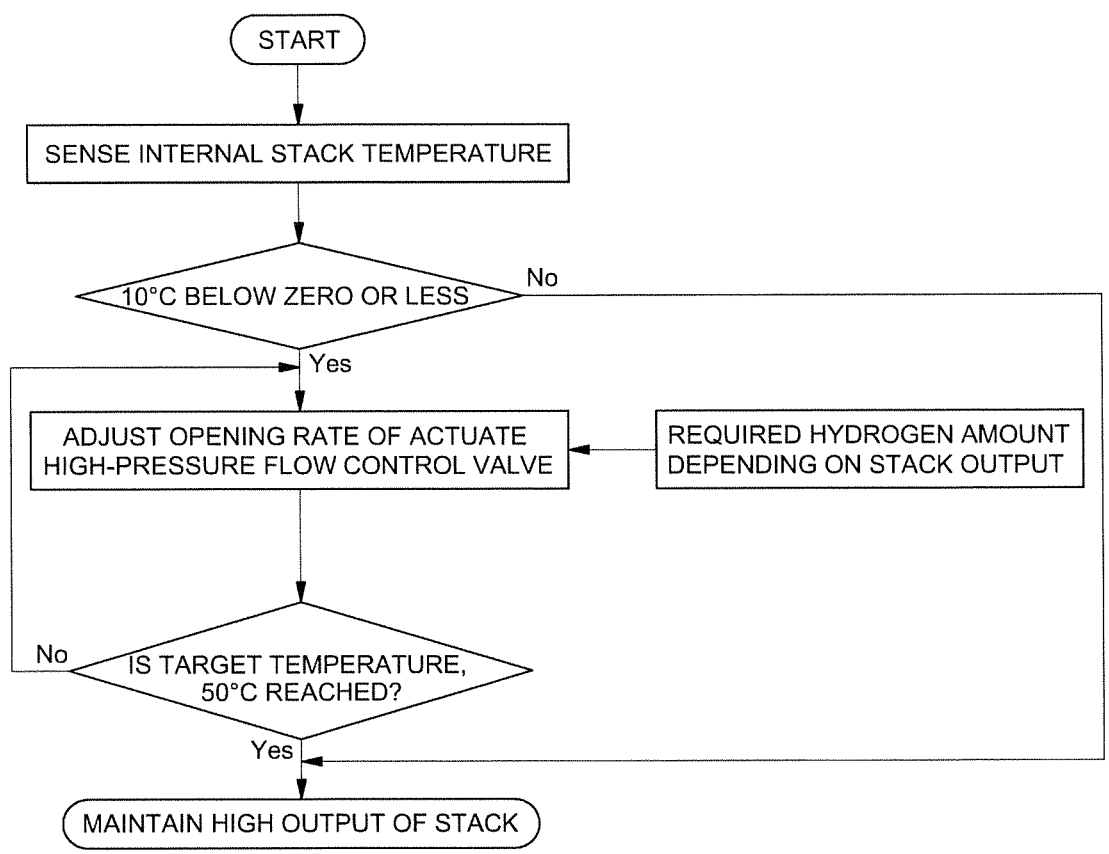
FIG. 2 is a flowchart illustrating a method for controlling a temperature of hydrogen supplied to a stack in high-output driving of the stack of a fuel cell vehicle according to another exemplary embodiment of the present inventive concept.
Figure 4:
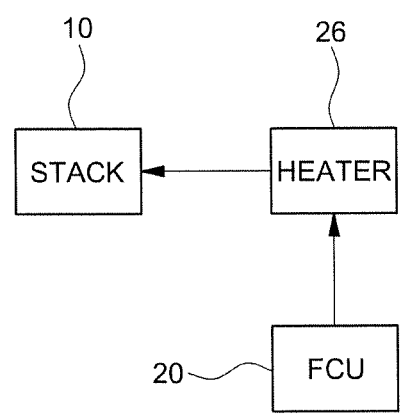

FIG. 1 illustrates a method for controlling a temperature of hydrogen supplied to a stack in low-temperature starting. FIG. 2 is a flowchart illustrating a method for controlling a temperature of hydrogen supplied to a stack in high-output driving of the stack of a fuel cell vehicle according to another exemplary embodiment of the present inventive concept. FIGS. 3 and 4 are configuration diagrams illustrating a low-temperature starting control system of a fuel cell vehicle according to an exemplary embodiment of the present inventive concept.

Referring to FIGS. 1-4, a fuel cell controller 20 senses and determines an internal temperature of a fuel cell stack 10 through a signal received from a temperature sensor 14 mounted on the fuel cell stack 10.

The temperature sensor 14 measures the internal temperature of the fuel cell stack 10 or a temperature at an inlet of a stack anode.

When the fuel cell controller 20 determines that the internal temperature of the stack 10 is a reference value, for example, 2° C. below zero or less to require controlling low-temperature starting, a cross-sectional area (opening rate) of a hydrogen passage (orifice) through which high-pressure hydrogen passes in a valve 12 is controlled by actuating the high-pressure hydrogen flow control valve 12 to depressurize a pressure of the high-pressure hydrogen, thereby increasing a temperature of the hydrogen. In this case, the high-pressure hydrogen flow control valve 12 controls a flow of the high-pressure hydrogen at about 100 lpm.

The reference value is an external temperature value, which is determined as an environment in which a low-temperature starting control of the fuel cell vehicle is required, and is set to a general value or a value previously determined through a experiment and an evaluation.

The high-pressure hydrogen flow control valve 12, which controls the flow of hydrogen supplied to the fuel cell stack, is fully open in general starting at room temperature and actuated according to a signal of the fuel cell controller 20 in the low-temperature starting to change and control an opening rate.

In the high-pressure hydrogen flow control valve 12, the opening rate of the passage through the which the high-pressure hydrogen passes is controlled according to the signal of the fuel cell controller 20 is controlled to form the orifice (hydrogen passage) having a narrow passage, and a depressurization degree of hydrogen passing through the orifice is changed according to the cross-sectional area of the orifice to control a temperature increase of the hydrogen.

Further, the fuel cell controller 20 actuates a heater 26 (see FIG. 4) of the air supply system in cold starting to increase the temperature of air supplied to the fuel cell stack 10.

That is, when the internal temperature of the stack 10 is the reference value or less, the fuel cell controller 20 actuates the heater 26 for heating the air supplied to the fuel cell stack 10 to increase the temperature of the air.

When the fuel cell controller 20 determines that the internal stack temperature reaches a stack activation target temperature for starting by directly increasing the temperatures of the hydrogen and the air supplied to the fuel cell stack 10, the fuel cell controller 20 determines that a temperature at which the fuel cell stack 10 reaches an actuatable (operable) temperature.

The temperature of a hydrogen tank 16, which is mounted on the fuel cell vehicle, gradually decreases and low-temperature hydrogen is supplied to the stack 10 while driving under low-temperature environment requiring the cold starting control, thus deteriorating a stack output. As a result, the temperature increase of the hydrogen supplied to the stack 10 to acquire a desired output from the stack 10 while driving is delayed.

For example, in order to maintain a high output of the stack 10 while driving or prevent local flooding while knocking, there is a time delay for increasing the temperature of the hydrogen supplied to the stack 10.

Therefore, in the present disclosure, in order to acquire a desired output of the fuel cell stack 10 while driving under the low-temperature environment, the temperature-increased hydrogen is supplied to the stack 10 by optimally adjusting the opening rate (alternatively, opening level) of the high-pressure hydrogen flow control valve 12 to prevent the deterioration of the stack output.

The direct temperature increase of the hydrogen supplied to the fuel cell stack 10 may help a rapid temperature increase of the stack cooled particularly while low-temperature knocking occurs.

Referring to FIG. 2, as the fuel cell controller 20 senses and determines the internal stack temperature while the high-output driving of the fuel cell stack 10, when the fuel cell controller 20 determines that the internal stack temperature is a reference value (for example, 10° C. below zero) which is previously set or less, the fuel cell controller 20 controls actuation of the heater 26 of the air supply system while controlling an opening rate of the high-pressure hydrogen flow control valve 12.

Herein, the reference value is set to a general external temperature value determined that the internal stack temperature needs to increase or a value previously determined through the experiment and the evaluation in order to maintain the output required for the stack 10 while driving the stack 10.

In more detail, when the fuel cell controller 20 determines that the stack 10 is in a low-temperature state in which the internal stack temperature or the temperature (alternatively, a hydrogen tank temperature) of the hydrogen supplied to the stack 10 is the reference value or less, the fuel cell controller 20 adjusts the opening rate of the high-pressure hydrogen flow control valve 12 by controlling the actuation of the high-pressure hydrogen flow valve 12 according to a required hydrogen amount for maintaining the high output of the stack 10.

The required hydrogen amount is determined as a supply amount of the hydrogen which needs to be supplied to the stack 10 according to the stack output and in the high-pressure hydrogen flow control valve 12, the internal hydrogen passage (orifice) is open only at an opening rate to secure the required hydrogen amount.

In this case, the opening rate of the high-pressure hydrogen flow control valve 12 depending on the required hydrogen amount is previously deduced and determined through experiment and evaluation to be mapped to a table which is stored in the fuel cell controller 20. That is, the table is made by matching the opening rate value of the high-pressure flow control valve 12 depending on the required hydrogen amount required in the stack while the high-output driving of the stack 10.

Further, the fuel cell controller 20 actuates the heater 26 of the air supply system to increase the temperature of the air supplied (alternatively, supercharged) to the stack 10.

That is, when the internal temperature of the stack 10 is the reference value or less, the fuel cell controller 20 actuates the heater 26 for heating the air supplied to the stack 10 to increase the temperature of the air.

The fuel cell controller 20 directly increases the temperatures of the hydrogen and the air supplied to the stack 10 to reduce a target temperature reach time of the stack 10 while driving. When the fuel cell controller 20 determines that the internal stack temperature reaches the stack activation target temperature for maintaining the high output, the fuel cell controller determines that the stack reaches a high-output actuatable (operable) temperature to thereby enhance a stack output deterioration phenomenon.

As described above, in the high-pressure hydrogen flow control valve 12, the opening rate is controlled by the fuel cell controller 20 and the cross-sectional area of the hydrogen passage (orifice) through which the high-pressure hydrogen passes in the valve 12 is adjusted to thereby increase the temperature of the high-pressure hydrogen passing through the high-pressure hydrogen flow control valve 12.

Referring to FIG. 3, the fuel cell controller 20 controls actuation and an opening rate of the high-pressure hydrogen flow control valve 12 according to a result of receiving and determining signals from a pressure sensor 18 installed approximate to the hydrogen tank 16 and a temperature sensor 14 installed in the stack 10 in the hydrogen supply system.

The pressure sensor 18 is installed inside the hydrogen tank 16 to sense the pressure of the hydrogen supplied to the stack 10 and the temperature sensor 14 is installed to measure a temperature in the stack 10 or at an inlet of the stack 10 to sense the internal stack temperature as mentioned as above.

As known, materials have Joule Thompson coefficients having respective predetermined values. Even the hydrogen has a Joule Thompson coefficient having a predetermined value, and in this case, the Joule Thompson coefficient is determined as Equation 1 given below.

$$du(\text{Joule Thompson coefficient})=(T1-T2)/(P1-P2) \quad \text{Equation 1}$$

Wherein, T1 represents a front-end temperature value of the high-pressure hydrogen flow control valve, T2 represents a rear-end temperature value of the high-pressure hydrogen flow control valve, P1 represents a front-end pressure value of the high-pressure hydrogen flow control valve, and P2 represents a rear-end pressure value of the high-pressure hydrogen flow control valve.

As a result, referring to Equation 1, when the hydrogen temperature at a front end of the high-pressure hydrogen flow control valve 12 and the hydrogen temperature (that is, a hydrogen target temperature) increased through the high-pressure hydrogen flow control valve 12 are known, a pressure difference required between the front and rear ends of the high-pressure hydrogen flow control valve 12 may be determined.

That is, when a temperature value of the hydrogen discharged from the hydrogen tank 16 is acquired and the hydrogen target temperature which may be increased through the high-pressure hydrogen flow control valve 12 are determined, the pressure difference required between the front and rear ends of the high-pressure hydrogen flow control valve 12 may be determined.

In this case, the hydrogen target temperature as the hydrogen temperature increased through the high-pressure hydrogen flow control valve 12 is set to a value deduced through a prior evaluation while the low-temperature starting.

Therefore, the fuel cell controller 20 acquires the front-end temperature of the high-pressure hydrogen flow control valve 12 by using a temperature measurement means (not illustrated) installed at the front end of the high-pressure hydrogen flow control valve 12 to determine the pressure difference required between the front and rear ends of the high-pressure hydrogen flow control valve 12.

When a pressure difference value required between the front and rear ends of the high-pressure hydrogen flow control valve 12 is determined, the fuel cell controller 20 may determine the cross-sectional area of the hydrogen passage (the opening rate of the orifice) of the high-pressure hydrogen flow control valve 12 through a previously configured table. The table is mapping-configured by previously/determining and matching the cross-sectional area of the hydrogen passage of the high-pressure hydrogen flow control valve 12 depending on the pressure difference value required between the front and rear ends of the high-pressure hydrogen flow control valve 12 through the experiment and the evaluation and stored in the fuel cell controller 20.

The fuel cell controller 20 controls the actuation of the high-pressure hydrogen flow control valve 12 according to the opening rate determined through the table to reduce the stack activation time while the low-temperature starting.

For example, when a difference between the stack activation target temperature and the internal stack temperature is larger than 0, the fuel cell controller 20 increases the temperature of the hydrogen by controlling the opening rate of the high-pressure hydrogen flow control valve 12.

In this case, the stack activation target temperature is set to a value which is previously deduced through the evaluation for each fuel cell system.

In addition, a pressure regulator 22 installed between the high-pressure hydrogen flow control valve 12 and the stack 10 adjusts the pressure of the hydrogen supplied to the stack 10 through the high-pressure hydrogen flow control valve 12.

Further, the fuel cell controller 20 controls actuation of a purging valve 24 which periodically purges mixed gas including the hydrogen and moisture discharged from the anode of the stack 10 and discharge the mixed gas to the atmosphere.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A system for controlling low-temperature starting of a fuel cell vehicle, the system comprising:
   a high-pressure hydrogen flow control valve controlling a flow of hydrogen supplied to a fuel cell stack; and
   a fuel cell controller configured to change and control an opening rate of the high-pressure hydrogen flow control valve when an internal temperature of the fuel cell stack is a reference value or less,
   wherein, when the opening rate of the high-pressure hydrogen flow control valve decreases, a pressure of the hydrogen passing through the high-pressure hydrogen flow control valve decreases to increase a temperature of the hydrogen supplied to the fuel cell stack,
   wherein the fuel cell controller determines a pressure difference value required between a front end and a rear end of the high-pressure hydrogen flow control valve in accordance with a temperature difference between the front end and the rear end of the high-pressure hydrogen flow control valve, and determines the opening rate of the high-pressure hydrogen flow control valve in accordance with the pressure difference value.

2. The system of claim 1, wherein the fuel cell controller determines the opening rate of the high-pressure hydrogen flow control valve in proportion to an amount of hydrogen required by the fuel cell stack when the internal temperature of the fuel cell stack is the reference value or less during high-output driving of the fuel cell stack.

3. The system of claim 1, wherein the fuel cell controller actuates a heater for heating air supplied to the fuel cell stack when the internal temperature of the stack is the reference value or less.

4. The system of claim 1, wherein the high-pressure hydrogen flow control valve is disposed between a hydrogen tank and the fuel cell stack.

5. The system of claim 1, wherein the opening rate of the high-pressure hydrogen flow control valve decreases according to a signal of the fuel cell controller, and
   wherein a depressurization degree of the high-pressure hydrogen passing through the hydrogen passage is changed according to the opening rate of the hydrogen passage to increase the temperature of the hydrogen.

6. A system for controlling low-temperature starting of a fuel cell vehicle, the system comprising:
   a high-pressure hydrogen flow control valve controlling a flow of hydrogen supplied to a fuel cell stack; and
   a fuel cell controller configured to determine an opening rate of the high-pressure hydrogen flow control valve in proportion to an amount of hydrogen required by the fuel cell stack when an internal temperature of the fuel cell stack is a reference value or less during high-output driving of the fuel cell stack, wherein a pressure of the hydrogen passing through the high-pressure hydrogen flow control valve decreases in accordance with the opening rate of the high-pressure hydrogen flow control valve to increase a temperature of the hydrogen supplied to the fuel cell stack, wherein the fuel cell controller is further configured to:
determine a pressure difference value required between a front end and a rear end of the high-pressure hydrogen flow control valve in accordance with a temperature difference between the front end and the rear end of the high-pressure hydrogen flow control valve, and determine the opening rate of the high-pressure hydrogen flow control valve in accordance with the pressure difference value.

7. The system of claim 6, wherein the fuel cell controller further determines the opening rate when the temperature of the hydrogen supplied to the stack is the reference value or less during high-output driving of the fuel cell stack.

8. A method for controlling low-temperature starting of a fuel cell vehicle, the method comprising steps of:
determining, by a fuel cell controller, whether an internal temperature of a fuel cell stack measured using a temperature sensor is a reference value or less;
controlling and changing, by the fuel cell controller, an opening rate of a high-pressure hydrogen flow control valve when the internal temperature is the reference value or less;
determining, by the fuel cell controller, a pressure difference value required between a front end and a rear end of the high-pressure hydrogen flow control valve in accordance with a temperature difference between the front end and the rear end of the high-pressure hydrogen flow control valve; and
determining, by the fuel cell controller, the opening rate of the high-pressure hydrogen flow control valve in accordance with the pressure difference value.

9. The method of claim 8, further comprising:
actuating a heater when the internal temperature is more than the reference value.

* * * * *